US011252806B2

(12) United States Patent
Jiang et al.

(10) Patent No.: US 11,252,806 B2
(45) Date of Patent: Feb. 15, 2022

(54) INTELLIGENT LAMP CONTROLLER DEVICE

(71) Applicant: OPPLE LIGHTING CO., LTD., Shanghai (CN)

(72) Inventors: Haitao Jiang, Shanghai (CN); Jun Wu, Shanghai (CN)

(73) Assignee: Opple Lighting Co., Ltd., Shanghai (CN)

(*) Notice: Subject to any disclaimer, the term of this patent is extended or adjusted under 35 U.S.C. 154(b) by 0 days.

(21) Appl. No.: 17/137,010

(22) Filed: Dec. 29, 2020

(65) Prior Publication Data
US 2021/0120651 A1 Apr. 22, 2021

Related U.S. Application Data

(63) Continuation of application No. PCT/CN2019/096412, filed on Jul. 17, 2019.

(30) Foreign Application Priority Data

Jul. 17, 2018 (CN) .......................... 201810784465.9
Jul. 17, 2018 (CN) .......................... 201821131860.9

(51) Int. Cl.
*H05B 47/105* (2020.01)
*H05B 45/20* (2020.01)
*H05B 47/19* (2020.01)

(52) U.S. Cl.
CPC ........... *H05B 47/105* (2020.01); *H05B 45/20* (2020.01); *H05B 47/19* (2020.01)

(58) Field of Classification Search
CPC ...... H05B 47/105; H05B 47/19; H05B 47/10; H05B 47/155; H05B 45/20; Y02B 20/40;
(Continued)

(56) References Cited

U.S. PATENT DOCUMENTS 7,731,387 B2    6/2010  Cortenraad et al.
9,167,673 B2 *  10/2015 Lee ........................ H05B 47/20
(Continued)

FOREIGN PATENT DOCUMENTS

CN    101036106 A    9/2007
CN    203491998 U    3/2014
(Continued)

OTHER PUBLICATIONS

International Search Report of PCT Application No. PCT/CN2019/096412 dated Oct. 8, 2019 with English translation, (5p).

*Primary Examiner* — Haissa Philogene
(74) *Attorney, Agent, or Firm* — Arch & Lake LLP

(57) ABSTRACT

The disclosure provides an intelligent lamp controller device for wirelessly controlling a lamp. The intelligent lamp controller device includes: at least one button, configured to receive a user's operation; a main control circuit board, configured to generate a lamp control instruction according to the user's operation received by the at least one button; a control instruction transmitter, electrically connected to the main control circuit board, and configured to receive the lamp control instruction from the main control circuit board and wirelessly transmit the lamp control instruction to the lamp, to control the lamp to emit light; and a preview light source, electrically connected to the main control circuit board, and configured to emit light according to the user's operation under control of the main control circuit board, so as to exhibit a luminescence effect corresponding to the user's operation to the user.

20 Claims, 7 Drawing Sheets

(58) Field of Classification Search
CPC . G06F 3/03547; G06F 3/0393; F21V 23/0435
See application file for complete search history.

(56) References Cited

U.S. PATENT DOCUMENTS

| | | | |
|---|---|---|---|
| 9,989,862 B2* | 6/2018 | Huebner | G03F 7/70683 |
| 10,652,986 B1* | 5/2020 | Romano | H05B 45/20 |
| 2014/0265864 A1 | 9/2014 | Hickok et al. | |
| 2016/0061438 A1* | 3/2016 | Lu | F21V 33/0056 |
| | | | 362/86 |
| 2020/0196425 A1* | 6/2020 | Carre | H05B 47/19 |

FOREIGN PATENT DOCUMENTS

| | | |
|---|---|---|
| CN | 204598379 U | 8/2015 |
| CN | 108811282 A | 11/2018 |
| CN | 208587881 U | 3/2019 |

\* cited by examiner

INTELLIGENT LAMP CONTROLLER DEVICE

CROSS-REFERENCE TO RELATED APPLICATIONS

This application is based upon and claims the priority of PCT patent application No. PCT/CN2019/096412 filed on Jul. 17, 2019 which claims priority to the Chinese patent application No. 201810784465.9 filed on Jul. 17, 2018 and the Chinese patent application No. 201821131860.9 filed on Jul. 17, 2018, the entire contents of all of which are incorporated by reference herein for all purposes.

TECHNICAL FIELD

The present disclosure relates to a field of household electrical appliances, and in particular, to an intelligent lamp controller device.

BACKGROUND

With people's increasingly higher requirements for the quality of life, the lighting functions of lamps tend to be diversified. In addition to the general traditional household lighting functions, full-color decorative lighting, scene lighting, and the like have also been developed, so that users can choose different lighting colors or different scene lighting modes according to needs, to achieve the desired lighting effect.

However, in some cases, during the user selects the lighting color or the scene lighting mode through a lamp controller, the user can see the lighting effect only after the lamp is controlled by the controller to emit light correspondingly, and then the user determines whether the lighting effect meets the needs of the user. If the lighting effect fails to meet the needs of the user, the user continues to switch to other colors or modes. In this way, frequent switching of colors or modes inevitably affects the service life of the lamp and causes unnecessary energy loss, and the user experience is not good.

Furthermore, a remote control of the lamp is generally realized by means of buttons of a remote controller. For example, for a full-color lamp, the light color of the lamp is adjusted by operating buttons or knobs of the remote controller. The buttons or knobs of the remote controller have limited numbers, and therefore, only a few artificially set colors can be obtained by operating the remote controller, and the light color of the lamp cannot be arbitrarily selected according to the preferences of the operator. For another example, as for the lamp remote controller for controlling multiple scene modes, one function button corresponds to one scene mode. With the increase of the number of buttons, the operation of the buttons of the remote controller becomes increasingly complicated, and there is no interaction with the user. Consequently, the remote control of the lamp is far from meeting the individual needs of users.

SUMMARY

The present disclosure provides an intelligent lamp controller device.

According to a first aspect of an embodiment of the present disclosure, an intelligent lamp controller device for wirelessly controlling a lamp is provided. The intelligent lamp controller device includes: at least one button, a main control circuit, a control instruction transmitter, and a preview light source. The at least one button is configured to receive a user's operation. The main control circuit board is configured to generate a lamp control instruction according to the user's operation received by the at least one button. The control instruction transmitter is electrically connected to the main control circuit board and configured to receive the lamp control instruction from the main control circuit board and wirelessly transmit the lamp control instruction to the lamp, so as to control the lamp to emit light. The preview light source is electrically connected to the main control circuit board, and configured to emit light according to the user's operation under control of the main control circuit board, so as to exhibit a luminescence effect corresponding to the user's operation to the user.

It is to be understood that both the foregoing general description and the following detailed description are exemplary and explanatory only and are not restrictive of the present disclosure.

BRIEF DESCRIPTION OF THE DRAWINGS

Various other advantages and benefits will become apparent to those of ordinary skill in the art upon reading the following detailed description of some embodiments of the disclosure. The drawings are only for the purpose of illustrating some embodiments, and are not to be considered as limiting the disclosure. Furthermore, throughout the drawings, the same components are denoted by the same reference numerals. In the drawings.

DETAILED DESCRIPTION

Figure 1:
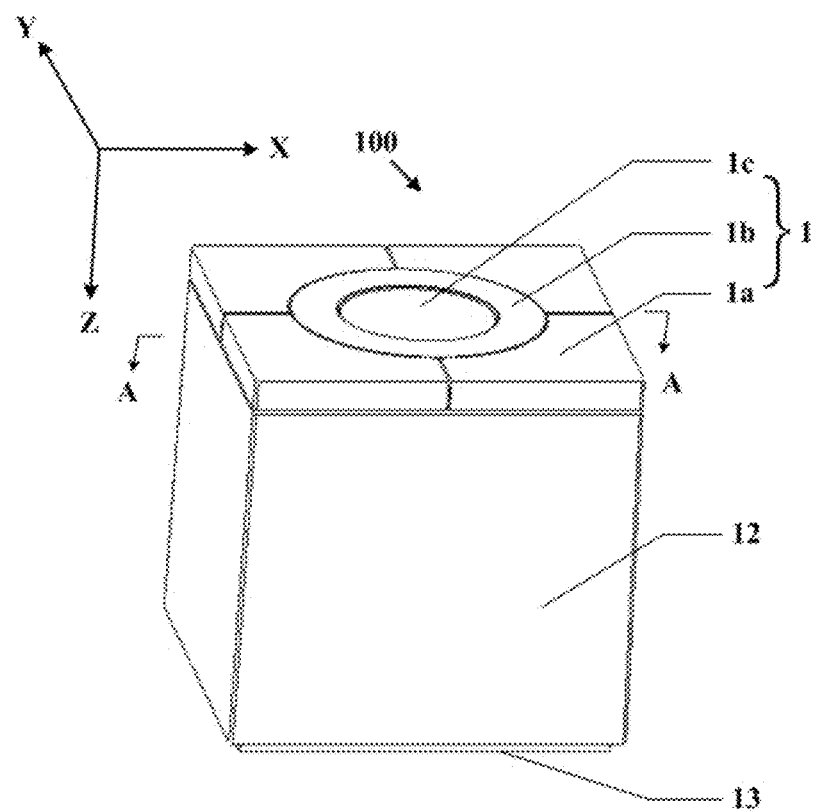
FIG. 1 is a three-dimensional schematic diagram of an intelligent lamp controller device according to an embodiment of the present disclosure.

Technical solution and advantages of the examples of the disclosure, the technical solutions of the present disclosure are described in connection with the examples of the present disclosure and the corresponding drawings. The described examples are just a part but not all of the examples of the present disclosure. Based on the examples of the present disclosure, those skilled in the art can obtain other example(s), without any inventive work, which should be within the scope of the disclosure.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

As shown in FIG. 1 to FIG. 10B, an embodiment of the present disclosure provides an intelligent lamp controller device 100, which is used for wireless control of a lamp.

Referring to FIG. 1 to FIG. 7, the intelligent lamp controller device 100 provided in the embodiment of the present disclosure includes at least one button 1, a main control circuit board 4, a preview light source 5, and a control instruction transmitter. In some embodiments, the control instruction transmitter may be a control instruction transmitter unit 14, a control instruction transmitter module, or a control instruction transmitter component.

The following is a detailed description of the elements of the intelligent lamp controller device 100 and the connection relationship between the elements according to the embodiment of the present disclosure.

The at least one button 1 is configured to receive a user's operation. The user's operation is, for example, an operation such as pressing, rotation, or the like.

The main control circuit board 4 is configured to generate a lamp control instruction according to the user's operation applied to the button 1.

The preview light source 5 is electrically connected to the main control circuit board 4, and is configured to emit light according to the user's operation under control of the main control circuit board 4, so as to exhibit a luminescence effect corresponding to the user's operation to the user.

The control instruction transmitter unit 14 is electrically connected to the main control circuit board 4 and is configured to receive the lamp control instruction of the main control circuit board 4 and wirelessly transmit the lamp control instruction to the lamp, to control the lamp to emit light.

According to the intelligent lamp controller device provided in the embodiment of the present disclosure, the preview light source is disposed in the intelligent lamp controller device and is configured to emit light according to the user's operation under control of the main control circuit board, so as to exhibit the luminescence effect corresponding to the user's operation to the user, the user can determine, according to the luminescence effect exhibited by the preview light source, whether the luminescence effect meets the needs of the user, and further, the lamp control instruction is transmitted to the lamp through the control instruction transmitter unit to control the lamp to emit light if the luminescence effect meets the needs of the user. Because the intelligent lamp controller device enables the user to preview the luminescence effect of the lamp, the user can select, without switching the luminescence state of the lamp for a plurality of times, the luminescence effect that meets the needs of the user, and further control the lamp to emit light with the required luminescence effect. In this way, the lamp is protected, the service life of the lamp is prolonged, interaction between the lamp with the user is enhanced, and the user experience is improved.

In one or more embodiments, in order to optimize arrangement of the elements in the intelligent lamp controller device 100, the intelligent lamp controller device 100 for example further includes a bracket 13 and a supporter part 3.

Figure 5:
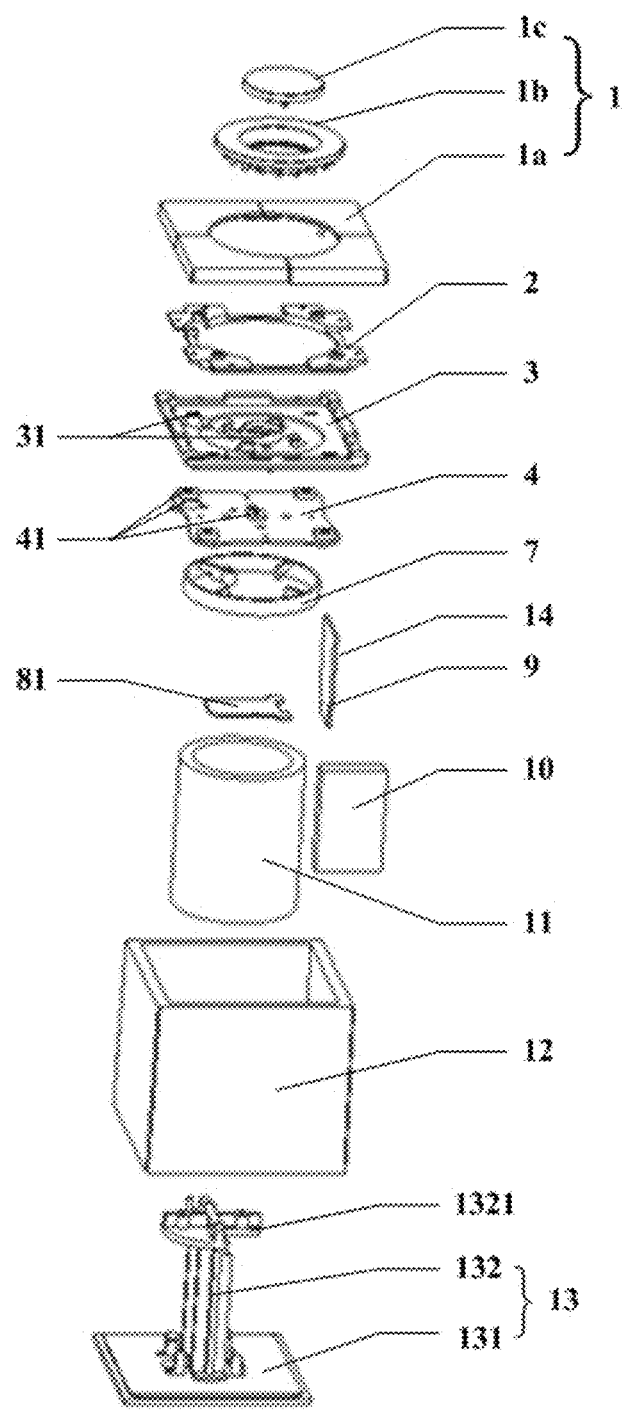
FIG. 5 is an exploded schematic diagram of the intelligent lamp controller device shown in FIG. 1.
Figure 6:
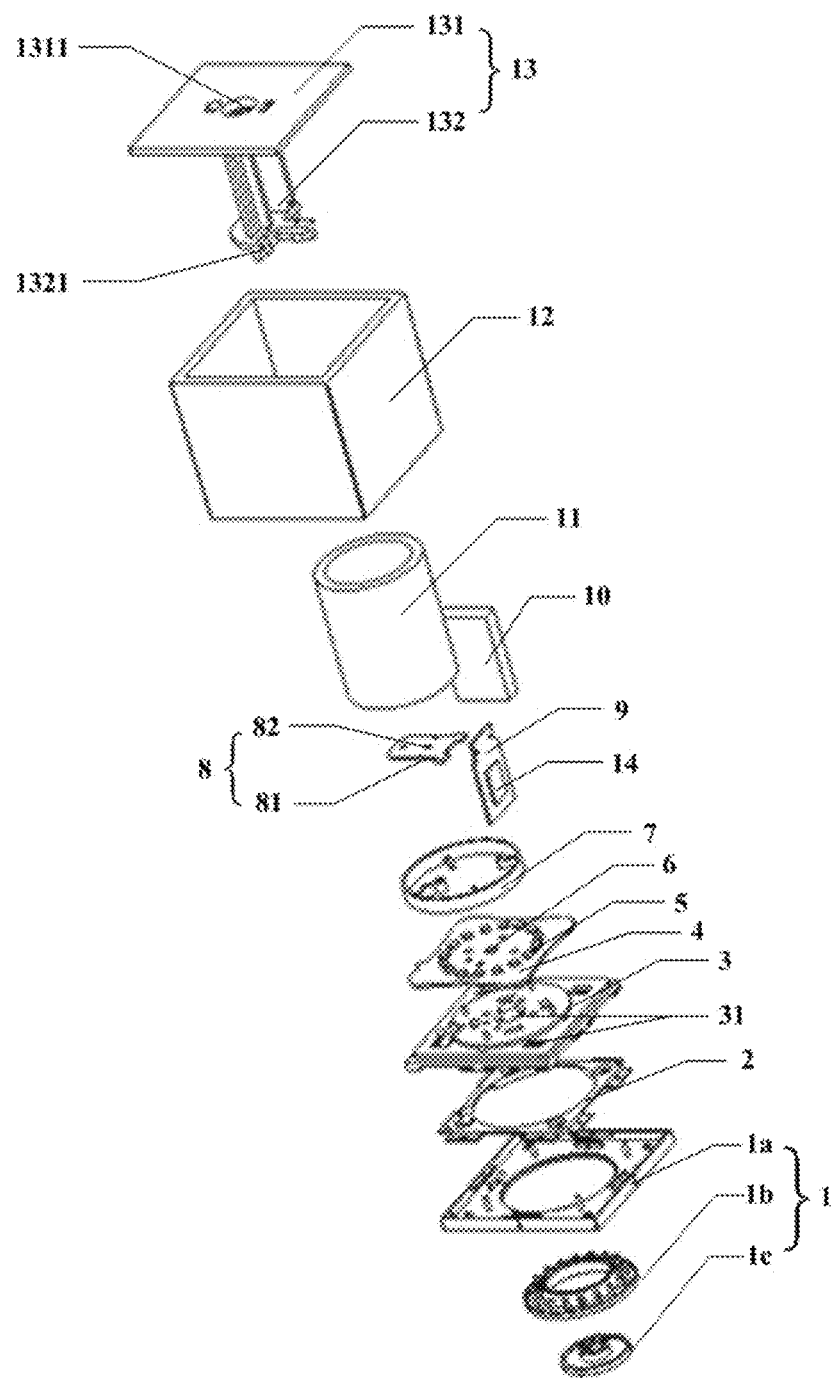
FIG. 6 is an exploded schematic diagram, taken from another view angle, of the intelligent lamp controller device shown in FIG. 1.
Figure 7:
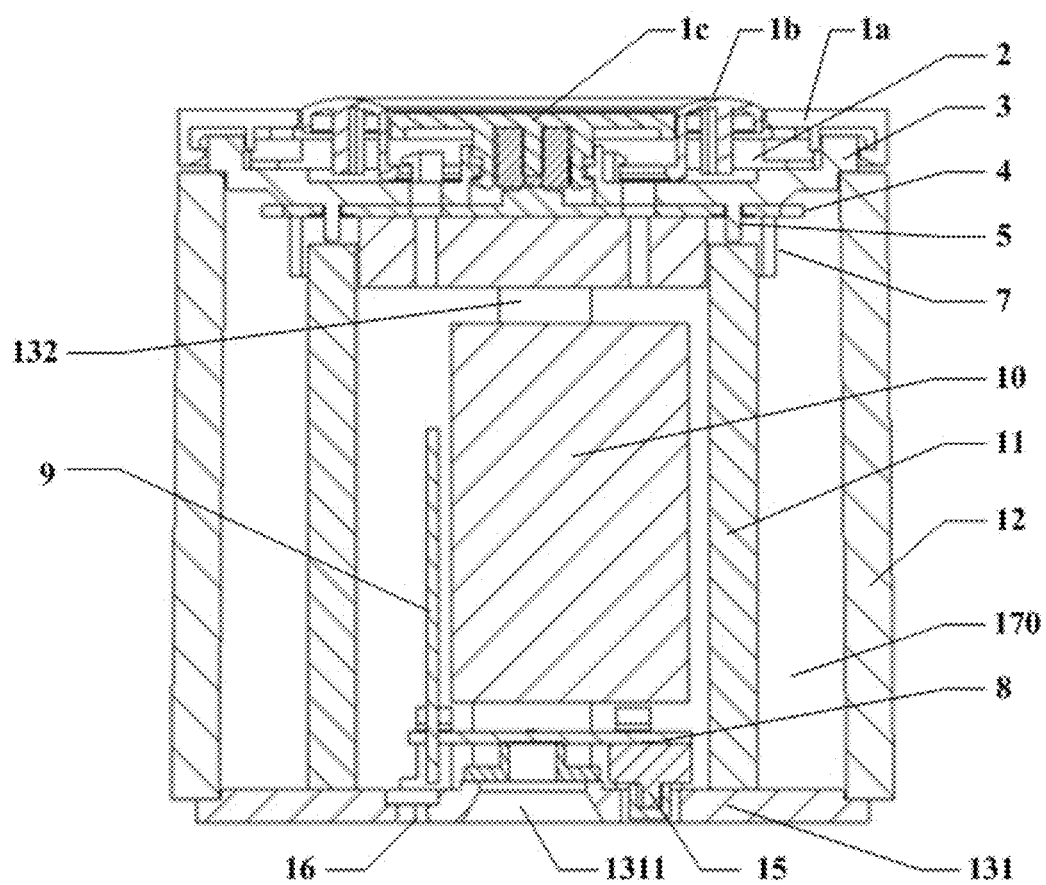
FIG. 7 is a cross-sectional view taken along a line A-A in FIG. 1.

As shown in FIG. 5 to FIG. 7, the bracket 13 includes a bottom plate 131 and a pillar 132 that are perpendicular to each other. Preferably, two support bars 1321 parallel to the bottom plate 131 are disposed on an end of the pillar 132 that is away from the bottom plate 131. The two support bars 1321 cross with each other and are substantially perpendicular to each other, to fixedly connect the supporter part 3 to the pillar 132, and provide sufficient support for an element directly or indirectly disposed on the end of the pillar 132 that is away from the bottom plate 131.

The supporter part 3 is disposed on the end of the pillar 132 that is away from the bottom plate 131, and is fixedly connected to the pillar 132. In the embodiment, the supporter part 3 is plate-shaped. In one or more embodiments, the supporter part 3 is fixedly connected to the pillar 132 through a screw.

The button 1 is disposed on a side of the supporter part 3 that is away from the pillar 132, and for example is used for being applied with operations by the user, such as lamp switch-on/off, brightness adjustment, color selection, color adjustment, scene mode selection, or the like.

The main control circuit board 4 is sandwiched between the supporter part 3 and the bracket 13. A function contact 41 in one-to-one correspondence to the button 1 is provided on an upper surface of the main control circuit board 4 that faces the button 1. Correspondingly, a through hole 31 in one-to-one correspondence to the function contact 41 provided on the upper surface of the main control circuit board 4 is provided in the supporter part 3. If the user operates the button 1, the corresponding function contact 41 is triggered, and then, the main control circuit board 4 operates in response to the user's operation.

The preview light source 5 is integrated on a lower surface of the main control circuit board 4 that is away from the button 1, and the main control circuit board 4 controls the preview light source 5 to emit light according to the user's operation, so that the preview light source 5 exhibits the luminescence effect corresponding to the user's operation to the user.

The control instruction transmitter unit 14 for example is disposed on the main control circuit board 4, to facilitate transmission of the lamp control signal, but the present disclosure is not limited thereto. Considering the space arrangement, the control instruction transmitter unit 14 for example is disposed on another element electrically connected to the main control circuit board 4, to fully use free space of the intelligent lamp controller device 100. The control instruction transmitter unit 14, for example, is a Bluetooth chip, a wifi chip, or the like.

In one or more embodiments, the intelligent lamp controller device 100 for example is designed to have a polyhedral shape, so that the user enables, by turning over the intelligent lamp controller device 100, the intelligent lamp controller device 100 to be located in a specific still placement posture, and controls the lamp by cooperating the specific still placement posture of the intelligent lamp controller device 100 with a specific gesture operation of the user. The foregoing polyhedral shape may be a shape of any polyhedron such as a hexahedron, an octahedron, or the like. This is not limited in the present disclosure.

Specifically, the intelligent lamp controller device 100 for example further includes a placement posture determining unit 6. For example, the placement posture determining unit 6 is a circuitry. The placement posture determining unit 6 is connected to the main control circuit board 4, and is configured to determine a posture of the intelligent lamp controller device 100 if the intelligent lamp controller device 100 is placed still. Correspondingly, a scene mode setting instruction and/or a luminescence color setting instruction, corresponding to the posture of the intelligent lamp controller device 100 that is placed still, for example is preset in the main control circuit board 4. In the embodiment, the placement posture determining unit 6 is disposed on the main control circuit board 4, to facilitate signal processing and transmission, but the present disclosure is not limited thereto.

Figure 4:
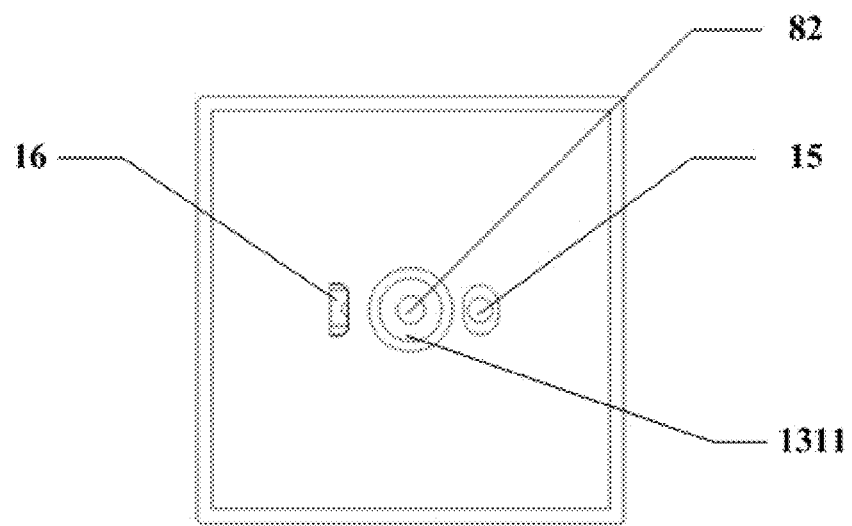
FIG. 4 is a schematic diagram of a bottom of the intelligent lamp controller device shown in FIG. 1.

Further, the intelligent lamp controller device 100 for example further includes a mode switching switch 15, the mode switching switch 15 is electrically connected to the main control circuit board 4 for controlling the main control circuit board 4 to generate, according to the user's operation, the lamp control instruction corresponding to different modes, so that the intelligent lamp controller device 100 switches between different modes. The foregoing different modes include a button control mode and a posture control mode. Referring to FIG. 4, in the embodiment, the mode switching switch 15 is disposed on a surface of the bottom plate 131 of the bracket 13 that is away from the pillar 132, to facilitate the user to operate the mode switching switch 15. However, the present disclosure is not limited thereto. The mode switching switch 15 may be disposed, according to actual needs, at any position convenient for the user.

If the intelligent lamp controller device 100 is in the button control mode, the button 1 is configured to receive the user's operation of controlling switch-on/off and/or brightness of the lamp. The main control circuit board 4 generates, according to the user's operation applied on the button 1, the lamp control instruction for controlling switch-on/off and/or brightness of the lamp, and sends the lamp control instruction to the control instruction transmitter unit 14.

Further, if the intelligent lamp controller device 100 is in the button control mode, the button 1 is further configured to receive the user's operation of setting a luminescence color and/or a scene mode of the lamp. The main control circuit board 4 controls, according to the user's operation applied on the button 1, the preview light source 5 to emit light according to the set luminescence color and/or scene mode, so that the user previews the luminescence effect of the lamp. In addition, the main control circuit board 4 generates the lamp control instruction for controlling the luminescence color and/or scene mode of the lamp after the user confirms the previewed luminescence effect, and sends the lamp control instruction to the control instruction transmitter unit 14. Herein, the user confirms the previewed luminescence effect by, for example, pressing a confirmation button, touching a confirmation button or the like.

If the intelligent lamp controller device 100 is in the posture control mode, the placement posture determining unit 6 determines the posture of the intelligent lamp controller device 100 that is placed still. The main control circuit board 4 determines, according to the determined posture of the intelligent lamp controller device 100 that is placed still, the scene mode and/or luminescence color setting instruction corresponding to the posture, and controls the preview light source 5 to emit light according to the determined scene mode and/or luminescence color setting instruction, so that user previews the luminescence effect of the lamp. In addition, the main control circuit board 4 generates the lamp control instruction for controlling the scene mode and/or luminescence color of the lamp after the user confirms the previewed luminescence effect, and sends the lamp control instruction to the control instruction transmitter unit 14.

The control operations in the button control mode and the posture control mode will be separately described below.

Figure 2:
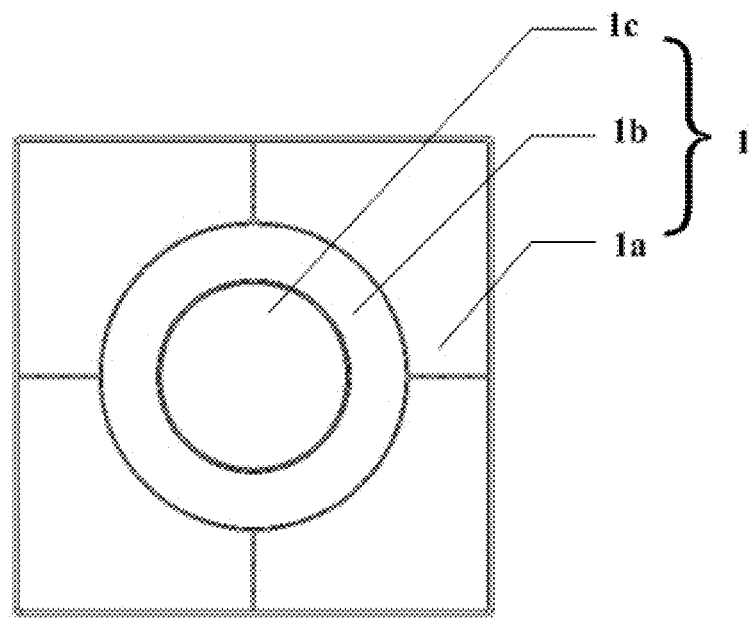
FIG. 2 is a schematic diagram of a top of the intelligent lamp controller device shown in FIG. 1.
Figure 3:
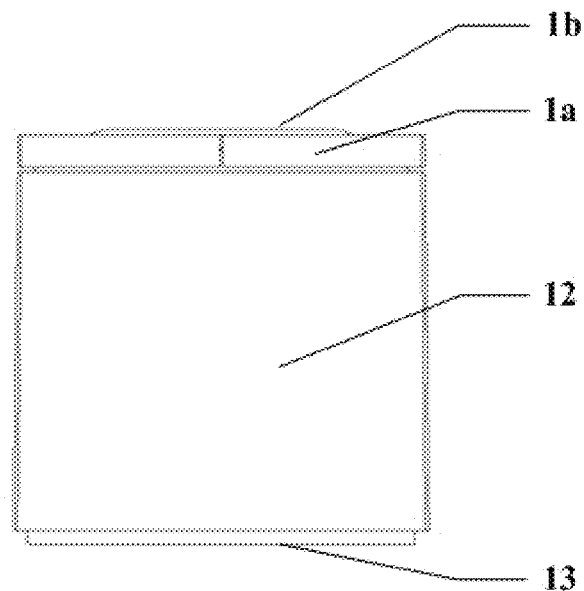
FIG. 3 is a schematic diagram of a side of the intelligent lamp controller device shown in FIG. 1.

Referring to FIG. 2 and FIG. 5, for example, the button 1 includes at least one panel button (not shown in the figure). If the intelligent lamp controller device 100 is in the button control mode, the at least one panel button is configured to receive the user's operation of controlling switch-on/off and/or brightness of the lamp. Further, the button 1 for example further includes at least one color selection button 1a and at least one dimming button 1b. If the intelligent lamp controller device 100 is in the button control mode, the color selection button 1a is configured to select a color from preset colors, and the dimming button 1b is configured to adjust the brightness of the selected color, so that the main control circuit board 4 sets the luminescence color of the lamp according to the use's operation applied on the color selection button 1a and the dimming button 1b, and controls the preview light source 5 to emit light with the set luminescence color of the lamp, to obtain single-color or mixed-color light. The foregoing preset colors for example include red, green, blue, and white, and the present disclosure is not limited thereto.

In a preferred implementation, the panel button and the color selection button 1a for example is implemented as a same button, that is, the color selection button 1a simultaneously has the function of receiving the user's operation of controlling the switch-on/off and/or brightness as well as color selection of the lamp. In actual application, this may be implemented in a plurality of manners. For example, in one manner, different functions of the color selection button 1a are implemented in different user's operation manners. If the user presses the color selection button 1a once, it is determined that the user's operation is an operation of controlling the switch-on/off or brightness of the lamp, and the main control circuit board 4 generates the lamp control instruction of controlling the switch-on/off or brightness of the lamp according to the user's operation applied on the color selection button 1a; if the user presses the color selection button 1a twice in succession, it is determined that the user's operation is a color selection operation, and the main control circuit board 4 sets the luminescence color of the lamp according to the user's operation applied on the color selection button 1a. For example, in another manner, different functions of the color selection button 1a are implements by a combination of the color selection button 1a and a function switching button (not shown). If the function switching button is switched to function 1, the color selection button 1a is configured to receive the user's operation of controlling the switch-on/off or brightness of the lamp; if the function switch button is switched to function 2, the color selection button 1a is configured to receive the user's operation of color selection. The implementations listed above are only illustrative, and the present disclosure is not limited thereto.

Figure 8:
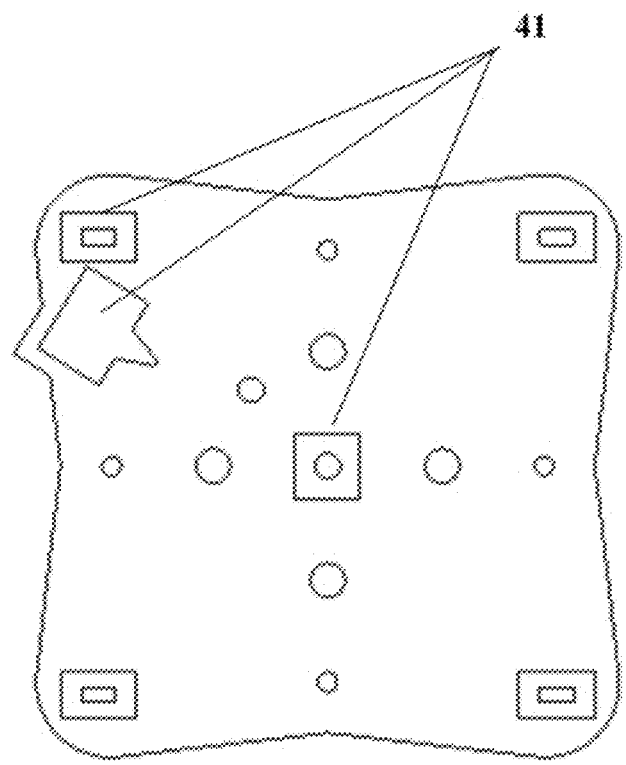
FIG. 8 is a schematic diagram of an upper surface, which faces a button, of a main control circuit board in the intelligent lamp controller device shown in FIG. 5.

In the embodiment, preferably, there are four color selection buttons 1a, which are respectively located at four corners of supporter part 3. The four color selection buttons 1a respectively correspond to the functions of switching on, switching off, increasing the brightness, and decreasing the brightness in the button control mode, and respectively correspond to the four colors of red, green, blue and white. The dimming button 1b is a ring-shaped dimming knob 1b, which is disposed at a central location between the four color selection buttons 1a. Correspondingly, as shown in FIG. 8, the upper surface of the main control circuit board 4 has the function contacts 41 that are located at four corners of the main control circuit board 4 and that are in one-to-one correspondence to the four color selection buttons 1*a*, and the function contact 41 that corresponds to the dimming knob 1*b* and that is disposed close to one of the function contacts 41 located at the four corners. More preferably, the function contact 41 corresponding to the dimming knob 1*b* is a micro-motional switch for detecting a rotation angle of the dimming knob 1*b*.

Further, in one or more embodiments, the preview light source 5 includes a red light emitting diode (LED) unit, a green LED unit, and a blue LED unit. If the user operates the color selection button 1*a* to select red, green, or blue, the red LED unit, the green LED unit, or the blue LED unit is individually controlled to correspondingly emit light. If the user operates the color selection button 1*a* to select white, the above three LED units are controlled at the same time to emit light, so as to obtain the white light by mixing and matching red, green, and blue in proportion. In another alternative implementation, the preview light source 5 includes the red LED unit, the green LED unit, the blue LED unit, and a white LED unit. If the user selects red, green, blue, or white by operating the color selection button 1*a*, the red LED unit, the green LED unit, the blue LED unit, or the white LED unit is individually controlled to correspondingly emit light.

In one or more embodiments, the button 1 for example further includes a scene mode setting button (not shown), configured to receive the user's operation of setting the scene mode of the lamp. The foregoing scene mode for example include a meeting scene mode, a film and television scene mode, a night light scene mode, a party scene mode, an office scene mode, or the like. This is not limited in the present disclosure. In an alternative implementation, the scene mode setting button and the color selection button 1*a* for example are implemented as a same button, which may be implemented in a manner similar to the case that the panel button and the color selection button 1*a* are implemented as the same button mentioned above. Details are not repeated herein.

In one or more embodiments, as shown in FIG. 1 to FIG. 7, the intelligent lamp controller device 100 further includes a color acquisition sensor electrically connected to the main control circuit board 4. In some embodiments, the color acquisition sensor may be a color acquisition sensor component 8, a color acquisition sensor unit, a color acquisition sensor module, or the like. In order to facilitate the color acquisition operation and securely fix the color acquisition sensor component 8, the color acquisition sensor component 8 for example is fixed at an end of the pillar 132 of the bracket 13 that is close to the bottom plate 131. Correspondingly, the bottom plate 131 of the bracket 13 is provided with a hole 1311 adapted to the color acquisition sensor component 8. The button 1 for example includes a color acquisition button 1*c*. In the embodiment, the color acquisition button 1*c* is disposed at a center of the dimming button 1*b*. Correspondingly, as shown in FIG. 8, the upper surface of the main control circuit board 4 has the function contact 41 that corresponds to the color acquisition button 1*c* and that is located at a center of the main control circuit board 4.

If the intelligent lamp controller device 100 is in the button control mode, the user presses the color acquisition button 1*c* to trigger a color acquisition operation. After the color acquisition button 1*c* is pressed, the corresponding function contact 41 on the main control circuit board 4 is triggered, and then the main control circuit board 4 generates a color acquisition signal according to the user's operation applied on the color acquisition button 1*c*, and sends the color acquisition signal to the color acquisition sensor component 8. After receiving the color acquisition signal, the color acquisition sensor component 8, according to the color acquisition signal, acquires a color of an external target object which the color acquisition sensor component 8 aims at through the hole 1311, generates a color signal corresponding to the acquired color, and sends the color signal to the main control circuit board 4, so that the main control circuit board 4 sets the luminescence color of the lamp according to the color signal, and controls the preview light source 5 to emit light with the set luminescence color of the lamp. After acquiring the color of the external target object, if the user does not operate the color selection button 1*a* and the dimming button 1*b* to further adjust the color but directly performs a confirmation operation, the main control circuit board 4 generates the corresponding lamp control instruction in response to the confirmation operation of the user, and sends the lamp control instruction to the control instruction transmitter unit 14; furthermore, after receiving the lamp control instruction, the control instruction transmitter unit 14 sends the lamp control instruction to the lamp, so that the lamp emits light of the acquired color. After acquiring the color of the external target object, if the user selects the color and brightness by operating the color selection button 1*a* and/or the dimming button 1*b* to further adjust the color, the main control circuit board 4 controls the preview light source 5 to emit light according to the acquired color signal of the target object and the color and the brightness selected by the user by operating the color selection button 1*a* and the dimming button 1*b*, thereby changing the color of the mixed light; then, if the user is satisfied with the color of the mixed light and performs a confirmation operation, the main control circuit board 4 generates the corresponding lamp control instruction in response to the confirmation operation of the user, and sends the lamp control instruction to the control instruction transmitter unit 14, and further, after receiving the lamp control instruction, the control instruction transmitter unit 14 sends the lamp control instruction to the lamp, so that the lamp emits light of the mixed color.

In one or more embodiments, referring to FIG. 5 and FIG. 6, the color acquisition sensor component 8 includes a color sensor circuit board 81, and a color sensor 82 that is disposed on a surface of the color sensor circuit board 81 that faces the bottom plate 131 of the bracket 13 and that is adapted to the hole 1311 on the bottom plate 131.

If the intelligent lamp controller device 100 is in the button control mode, after the user presses the color acquisition button 1*c* to trigger the color acquisition operation, the color sensor circuit board 81 receives the color acquisition signal generated by the main control circuit board 4 and controls the color sensor 82 to acquire the color according to the color acquisition signal. The color sensor 82 acquires the color of the external target object which the color sensor 82 aims at through the hole 1311 under the control of the color sensor circuit board 81, and sends the acquired color information to the color sensor circuit board 81. Then, after receiving the color information, the color sensor circuit board 81 processes the color information, generates the color signal corresponding to the acquired color information, and transmits the color signal to the main control circuit board 4, so that the main control circuit board 4 controls the preview light source 5 to emit light according to the color signal.

In one or more embodiments, the intelligent lamp controller device 100 further includes a transparent lampshade 12, which is disposed on the outer periphery of the intelligent lamp controller device 100 and surrounds the preview light source 5, so that the light emitted by the preview light source 5 is transmitted outward through the transparent lampshade 12. Specifically, referring to FIG. 1 to FIG. 7, the transparent lampshade 12 for example is disposed between the bottom plate 131 and the supporter part 3, so that the transparent lampshade 12 as well as the bottom plate 131 and the supporter part 3 enclose an internal space 160 of the intelligent lamp controller device 100. The transparent lampshade 12 may be made of Acrylic material to achieve good light transmission performance. Preferably, the outer side of the transparent lampshade 12 is made of a transparent material, such as the acrylic material, and the inner side of the transparent lampshade 12 is made of a semi-transparent white spray-paint coating, so that the transparent lampshade 12 achieves a transparent appearance. It should be noted that the shape of the transparent lampshade 12 in the drawings is only schematic, and the present disclosure is not limited thereto.

The transparent lampshade 12 for example is in the shape of a polyhedron with n sides, and its shape is substantially consistent with the polyhedral shape of the intelligent lamp controller device 100, where n is an integer greater than or equal to 3. Correspondingly, n scene modes or n luminescence color setting instructions, in one-to-one correspondence to the n sides of the polyhedral transparent lampshade 12, are preset in the main control circuit board 4. The foregoing scene modes for example includes the meeting scene mode, the film and television scene mode, the night light scene mode, the party scene mode, the office scene mode, or the like. The luminescence color setting instructions for example include a light color selection instruction and/or a light color brightness adjustment instruction, or the like. This is not limited in the present disclosure.

In the case that the intelligent lamp controller device 100 is in the posture control mode, if the user places the intelligent lamp controller device 100 still in the way that one side of the polyhedral transparent lampshade 12 faces a specific direction (for example, an upward direction perpendicular to a horizontal plane), then the placement posture determining unit 6 determines the side that is of the polyhedral transparent lampshade 12 and that corresponds to the specific direction if the intelligent lamp controller device 100 is placed still. According to the side corresponding to the specific direction, the main control circuit board 4 determines the scene mode or luminescence color setting instruction corresponding to the side, and controls the preview light source 5 to emit light with the determined scene mode or luminescence color.

The placement posture determining unit 6 for example is an acceleration sensor, a gyroscope, or the like. Determining the orientation of the object by using the acceleration sensor or the gyroscope is a technology known in the art, and details thereof are not repeated herein. Preferably, the placement posture determining unit 6 is an acceleration sensor.

Taking a quadrangular transparent lampshade with four sides perpendicular to a bottom (for example, the bottom is rectangular) and the acceleration sensor as an example, the foregoing posture control mode is described below in detail with reference to FIG. 1.

As shown in FIG. 1, the X direction represents the horizontal rightward direction, the Y direction represents the horizontal backward direction, and the Z direction represents the vertical downward direction. It should be noted that the X, Y, and Z directions shown in FIG. 1 are only schematic and are related to the mounting manner of the acceleration sensor. In the embodiment, the central axis of the transparent lampshade 12 is parallel to the Z direction.

Taking the X, Y and Z directions as the reference, the four sides of the quadrangular transparent lampshade 12 are respectively represented as follows: the side that is parallel to the X and Z directions, perpendicular to the Y direction, and located in the Y direction relative to the center point of the intelligent lamp controller device 100 is a rear side, the side that is parallel to the Y and Z directions, perpendicular to the X direction, and located in the X direction relative to the center point of the intelligent lamp controller device 100 is a right side, the side that is parallel to the X and Z directions, perpendicular to the Y direction, and located in the reverse direction of the Y direction relative to the center point of the intelligent lamp controller device 100 is a front side, and the side that is parallel to the Y and Z directions, perpendicular to the X direction, and located in the reverse direction of the X direction relative to the center point of the intelligent lamp controller device 100 is a left side. Correspondingly, a first scene mode or luminescence color setting instruction, a second scene mode or luminescence color setting instruction, a third scene mode or luminescence color setting instruction, and a fourth scene mode or luminescence color setting instruction that are respectively in one-to-one correspondence to the rear side, the right side, the front side, and the left side of the quadrangular transparent lampshade 12 are preset in the main control circuit board 4.

In the case that the intelligent lamp controller device 100 is in the posture control mode, if the user turns over the intelligent lamp controller device 100 so that one side of the quadrangular transparent lampshade 12 in the still state is placed to be horizontally upward, the acceleration sensor 6 senses acceleration values $a_X$, $a_Y$, and $a_Z$ in the X, Y, and Z directions of the intelligent lamp controller device 100, and sends the acceleration values $a_X$, $a_Y$, and $a_Z$ to the main control circuit board 4.

The main control circuit board 4 determines, according to the acceleration values $a_X$, $a_Y$, and $a_Z$, the horizontally upward side of the quadrangular transparent lampshade 12, and determines the scene mode or luminescence color setting instruction corresponding to the determined side. Specifically, if both $a_Z$ and $a_X$ are close to 0 and $a_Y$ is close to g, preferably, $a_Z$ and $a_X$ are in the range of $0\pm0.1$ g, and $a_Y$ is in the range of $g\pm0.1$ g, then it is determined that the horizontally upward side of the quadrangular transparent lampshade 12 is the rear side, and the first scene mode or luminescence color setting instruction corresponding to the rear side is determined. If both $a_Z$ and $a_Y$ are close to 0 and $a_X$ is close to g, preferably, $a_Z$ and $a_Y$ are in the range of $0\pm0.1$ g, and $a_X$ is in the range of $g\pm0.1$ g, then it is determined that the horizontally upward side of the quadrangular transparent lampshade 12 is the right side, and the second scene mode or luminescence color setting instruction corresponding to the right side is determined. If both $a_Z$ and $a_X$ are close to 0 and $a_Y$ is close to −g, preferably, $a_Z$ and $a_X$ are in the range of $0\pm0.1$ g, and $a_Y$ is in the range of $-g\pm0.1$ g, then it is determined that the horizontally upward side of the quadrangular transparent lampshade 12 is the front side, and the third scene mode or luminescence color setting instruction corresponding to the front side is determined. If both $a_Z$ and $a_Y$ are close to 0 and $a_X$ is close to −g, preferably, $a_Z$ and $a_Y$ are in the range of $0\pm0.1$ g, and $a_X$ is in the range of $-g\pm0.1$ g, then it is determined that the horizontally upward side of the quadrangular transparent lampshade 12 is the left side, and the fourth scene mode or luminescence color setting instruction corresponding to the left side is determined. For ease of description, in this example, assuming that the front side of the quadrangular transparent lampshade 12 is placed to be horizontally upward, the main control circuit board 4, according to the acceleration value sensed by the acceleration sensor 6, determines the third scene mode or luminescence color setting instruction corresponding to the front side.

After determining the third scene mode or luminescence color setting instruction, the main control circuit board 4 controls the preview light source 5 to emit light in the third scene mode or the luminescence color set by the third luminescence color setting instruction. The light emitted by the preview light source 5 is transmitted outward through the transparent lampshade 12 to exhibit the luminescence effect to the user. After the user confirms the previewed luminescence effect, the main control circuit board 4 generates the corresponding lamp control instruction and sends the lamp control instruction to the control instruction transmitter unit 14, and then the control instruction transmitter unit 14 sends the lamp control instruction to the lamp, so that the lamp emits light in the third scene mode or the luminescence color set by the third luminescence color setting instruction.

In an alternative implementation, in order to realize the diversification of control instructions, each side of the polyhedral transparent lampshade 12 for example is enabled to correspond to multiple scene modes or luminescence color setting instructions. In order to simplify the description, the following description is made by using an example that each side of the polyhedral transparent lampshade 12 corresponds to two scene modes or luminescence color setting instructions.

For example, the two scene modes or luminescence color setting instructions corresponding to the first side of the n sides of the polyhedral transparent lampshade 12 are a scene mode or luminescence color setting instruction A and a scene mode or luminescence color setting instruction B, respectively. For example, in one manner, the recognition of the scene mode or luminescence color setting instruction is realized by the combination of the placement posture determining unit 6 and an instruction set switching button (not shown). Specifically, for example, in the case that the instruction set switching button is switched to an instruction set 1, if the placement posture determining unit 6 determines that the first side of the polyhedral transparent lampshade 12 corresponds to the specific direction when the intelligent lamp controller device 100 is placed still, then the main control circuit board 4 determines that the instruction corresponding to the first side is the scene mode or luminescence color setting instruction A. On the contrary, in the case that the instruction set switching button is switched to an instruction set 2, if the placement posture determining unit 6 determines that the first side of the polyhedral transparent lampshade 12 corresponds to the specific direction when the intelligent lamp controller device 100 is placed still, then the main control circuit board 4 determines that the instruction corresponding to the first side is the scene mode or luminescence color setting instruction B. For example, in another manner, the recognition of the scene mode or luminescence color setting instruction is realized by a combination of a posture recognition by the placement posture determining unit 6 and an action recognition of the user. Specifically, for example, if the placement posture determining unit 6 determines that the first side of the polyhedral transparent lampshade 12 corresponds to the specific direction when the intelligent lamp controller device 100 is placed still, the action of the user within the specific time during is further recognized. If the action of the user is a single tap, the control instruction is determined to be the scene mode or luminescence color setting instruction A. If the action of the user is two successive taps, the control instruction is determined to be the scene mode or luminescence color setting instruction B. The implementations listed above are only illustrative, and those skilled in the art may understand that for a case that each side of the polyhedral transparent lampshade 12 corresponds to multiple scene modes or luminescence color setting instructions, a variety of other manners may also be used to recognize each scene mode or luminescence color setting instruction. This is not limited in the present disclosure.

As mentioned above, in the posture control mode, the main control circuit board 4 generates the lamp control instruction for controlling the luminescence color and/or scene mode of the lamp after the user confirms the previewed luminescence effect, and sends the lamp control instruction to the control instruction transmitter unit 14. In order to enhance the interaction and entertainment with the user, the user for example confirms the previewed luminescence effect by performing specific gesture operations on the intelligent lamp controller device 100 (for example, tapping or shaking the intelligent lamp controller device 100).

In one or more embodiments, the intelligent lamp controller device 100 for example further includes a gesture operation determining unit (for example, a gesture operation determining circuit) electrically connected to the main control circuit board 4, for determining the specific gesture operation of the user on the intelligent lamp controller device 100, so that the main control circuit board 4 determines, according to the specific gesture operation of the user, that the user has confirmed the previewed luminescence effect. The gesture operation determining unit for example is an acceleration sensor, a gyroscope, or the like. As shown in FIG. 6, the gesture operation determining unit and the placement posture determining unit 6 is integrated with each other. The integrated component implements the functions of the gesture operation determining unit and the placement posture determining unit 6. For example, the integrated component is the acceleration sensor or the gyroscope.

The following describes a process of determining the specific gesture operation with reference to FIG. 1 by using the acceleration sensor as an example.

After the main control circuit board 4 controls the preview light source 5 to emit light with the set luminescence color and/or scene mode of the lamp, the acceleration sensor 6 senses the acceleration values $a_X$, $a_Y$ and $a_Z$ in the X, Y, and Z directions of the intelligent lamp controller device 100, and sends the acceleration values $a_X$, $a_Y$ and $a_Z$ to the main control circuit board 4. Then, the main control circuit board 4 calculates a composite acceleration value of the acceleration values $a_X$, $a_Y$, and $a_Z$ according to a specific formula, and compares the calculated composite acceleration value with a preset threshold. If the composite acceleration value is greater than the preset threshold, it is determined that the user has tapped or shaken the intelligent lamp controller device 100, that is, the user confirms the previewed luminescence effect.

Specifically, the foregoing specific formula is as follows:

Composite acceleration value=$\sqrt{a_X^2+a_Y^2+a_Z^2}$, where the preset threshold is 3 g, g is the acceleration of gravity, and g=9.8 m/s2.

As mentioned above, in the button control mode, the color acquisition sensor component 8 performs color acquisition of the target object under the control of the main control circuit board 4 in response to the user's operation applied on the color acquisition button 1c. Further, in the posture control mode, the color acquisition sensor component 8 also performs color acquisition of the target object under the control of the main control circuit board 4 in response to the user's operation on the placement posture of the intelligent lamp controller device 100.

In one or more embodiments, the luminescence color setting instructions corresponding to the sides of the polyhedral transparent lampshade 12 include a color acquisition instruction. In the case that the intelligent lamp controller device 100 is in the posture control mode, if the placement posture determining unit 6 determines that the posture of the intelligent lamp controller device 100 that is placed still corresponds to the color acquisition instruction, the color acquisition sensor component 8 acquires the color of the external target object under control of the main control circuit board 4 and generates the corresponding color signal.

In one or more embodiments, in order to uniformly mix the light emitted by the preview light source and in order that the mixed light is transmitted outward, the intelligent lamp controller device 100 for example further includes a light guide part 11 disposed in the internal space 160, an end of the light guide part 11 faces the preview light source 5, and a light mixing cavity 170 is formed between the light guide part 11 and the transparent lampshade 12. The light guide part 11 is configured to receive, through its end facing the preview light source 5, the light emitted by the preview light source 5, transmit the light emitted by the preview light source 5, and then uniformly emit the light emitted by the preview light source 5 to the light mixing cavity 170, so that the light emitted by the preview light source 5 is uniformly mixed in the light mixing cavity 170.

Figure 9:
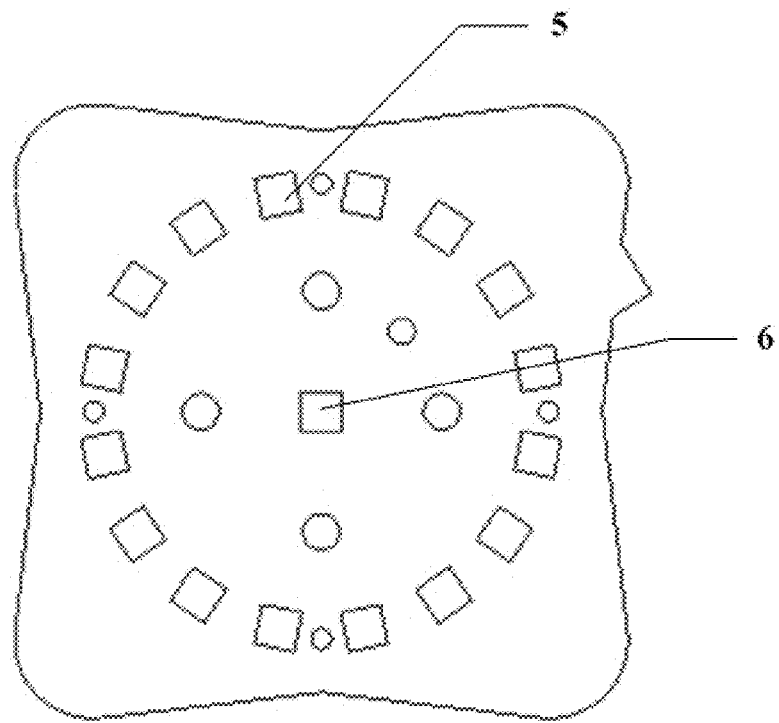
FIG. 9 is a schematic diagram of a lower surface, which is away from the button, of the main control circuit board in the intelligent lamp controller device shown in FIG. 5.

Preferably, as shown in FIG. 7 and FIG. 9, the preview light source 5 is arranged in a ring shape on the lower surface of the main control circuit board 4 that is away from the button 1. The light guide part 11 is a light guide ring 11, which is located between the preview light source 5 and the bottom plate 131 of the bracket 13, the end of the light guide ring 11 that is away from the bottom plate 131 directly faces the preview light source 5, and the light mixing cavity 170 is formed between the light guide ring 11 and the transparent lampshade 12. The light emitted by the preview light source 5 enters the light guide ring 11 through the end of the light guide ring 11 that directly faces the preview light source 5, is transmitted by the light guide ring 11, and then is emitted from the outer peripheral surface of the light guide ring 11 to the light mixing cavity 170. Furthermore, the light emitted by the preview light source 5 is sufficiently and uniformly mixed in the light mixing cavity 170, and then is emitted outward through the transparent lampshade 12.

Furthermore, as shown in FIG. 5 to FIG. 7, the intelligent lamp controller device 100 for example further includes a light shielding ring 7. The light shielding ring 7 is disposed on the lower surface of the main control circuit board 4, and closely attaches to an outer side of the end of the light guide ring 11 that directly faces the preview light source 5, so as to prevent the light emitted by the preview light source 5 from being directly emitted to the transparent lampshade 12, thereby avoiding a case of non-uniform mixing of light.

In one or more embodiments, as shown in FIG. 5 and FIG. 6, the intelligent lamp controller device 100 for example further includes a rubber pad 2, which is disposed between the color selection button 1*a* and the supporter part 3, and has protrusions in one-to-one correspondence to the function contacts that are on the main control circuit board 4 and that correspond to the color selection buttons 1*a*, and is configured to deliver the pressure applied on the color selection buttons 1*a* to the function contacts and protect the function contacts.

In one or more embodiments, as shown in FIG. 5 and FIG. 6, the intelligent lamp controller device 100 for example further includes a power supply circuit board 9 and a lithium battery 10 connected to each other. The power supply circuit board 9 is electrically connected to other electrical elements in the intelligent lamp controller device 100, so that the lithium battery 10 supplies power to the other electrical elements in the intelligent lamp controller device 100 through the power supply circuit board 9. The foregoing electrical elements include, but are not limited to, the main control circuit board 4, the preview light source 5, the placement posture determining unit 6, the gesture operation determining unit, the color acquisition sensor component 8 and the control instruction transmitter unit 14. In particular, the control instruction transmitter unit 14 for example is directly disposed on the power supply circuit board 9, so that not only the layout space on the main control circuit board 4 is prevented from being occupied, but also the power supply to the control instruction transmitter unit 14 is ensured.

Further, the bottom plate 131 of the bracket 13 for example is provided with a universal serial bus (USB) interface 16. The power supply circuit board 9 is connected to the USB interface 16, so that the power supply circuit board 9 is connected to an external power source (such as a commercial power supply, a mobile power supply, or the like) through the USB interface 16 to charge the lithium battery 10.

Figure 10A:
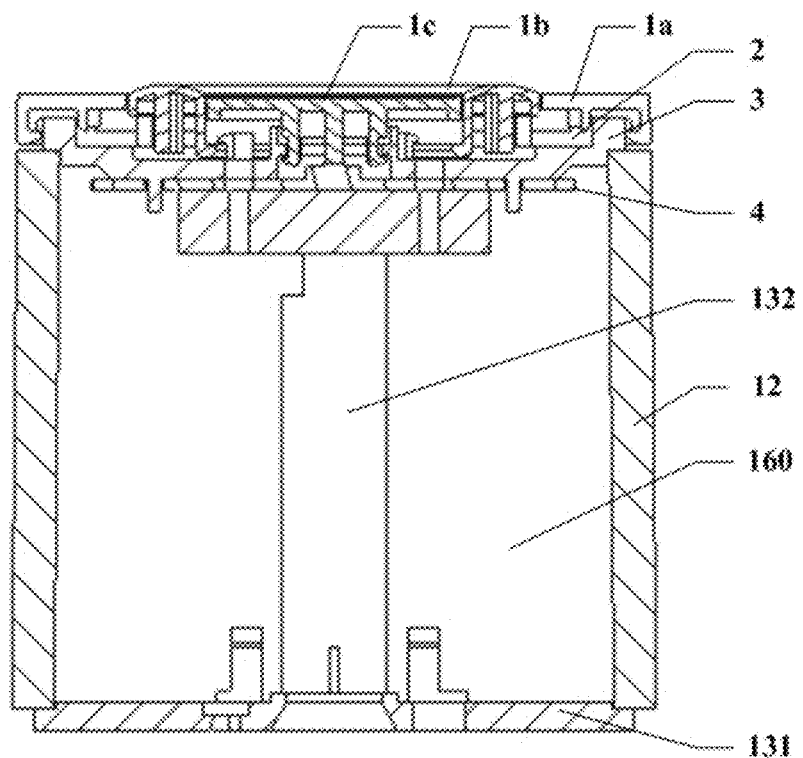
FIG. 10A and FIG. 10B are simplified schematic diagrams of a mechanical connection manner between elements in the intelligent lamp controller device shown in FIG. 7.
Figure 10B:
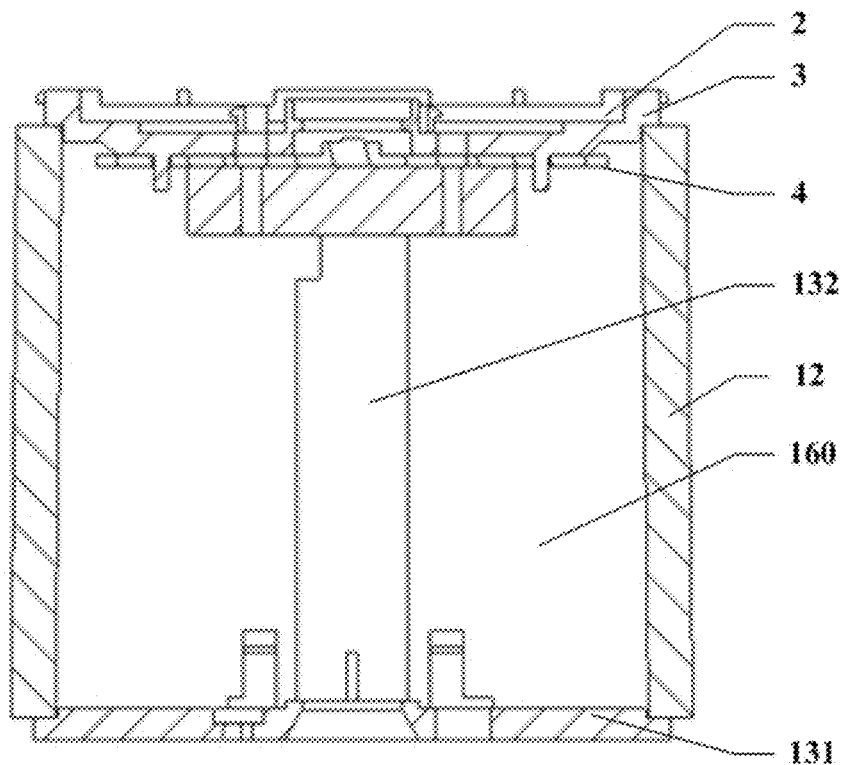

The foregoing describes the elements in the intelligent lamp controller device 100 and the connection relationship between the elements according to the embodiment of the present disclosure. As mentioned above, the supporter part 3 may be fixedly connected to the pillar 132 of the bracket 13 through the screw. In addition, other elements in the intelligent lamp controller device 100 that need to be fixed on the supporter part 3 or on the bracket 13 or between the bracket 13 and supporter part 3 may be fixed through a snap connection structure. FIG. 10A and FIG. 10B schematically show the mechanical connection between some main elements in the intelligent lamp controller device 100; compared with FIG. 10A, FIG. 10B does not show the color selection button 1*a*, dimming button 1*b* and the color acquisition button 1*c* so as to show more clearly the snap connection structure used to fix the color selection button 1*a*, the dimming button 1*b*, and the color acquisition button 1*c* to the supporter part 3. Specifically, referring to FIG. 10A and FIG. 10B, and further referring to FIG. 7, the transparent lampshade 12 is clamped between the supporter part 3 and the bottom plate 131 of the bracket 13, so that the transparent lampshade 12, the bottom plate 131, and the supporter part 3 enclose the internal space 160. The color selection button 1*a*, the dimming button 1*b*, and the color acquisition button 1*c* are fixed on the supporter part 3 through the snap connection structure. The main control circuit board 4 is sandwiched between the supporter part 3 and the bracket 13 through the snap connection structure. The color sensor circuit board 81 and the power supply circuit board 9 are fixed on the bracket 13 through the snap connection structure.

In conclusion, according to the intelligent lamp controller device provided in the embodiment of the present disclosure, the preview light source is disposed in the intelligent lamp controller device and is configured to emit light according to the user's operation under control of the main control circuit board, so as to exhibit the luminescence effect corresponding to the user's operation to the user, so that the user determines, according to the luminescence effect exhibited by the preview light source, whether the luminescence effect meets the needs of the user, and further, the lamp control instruction is sent to the lamp through the control instruction transmitter unit to control the lamp to emit light if the luminescence effect meets the needs of the user. Because the intelligent lamp controller device enables the user to preview the luminescence effect of the lamp, the user select, without switching the luminescence state of the lamp for a plurality of times, the luminescence effect that meets the needs of the user, and further control the lamp to achieve the required luminescence effect. In this way, the lamp is protected, the service life of the lamp is prolonged, interaction with the user is enhanced, and user experience is improved.

Furthermore, the intelligent lamp controller device switches between the button control mode and the posture control mode. In the case that the intelligent lamp controller device is in the button control mode, not only the switch-on/off and/or the brightness of the lamp is controlled through the button, but also the luminescence color and/or scene mode of the lamp is set through the button, and the preview light source is controlled to emit light with the set luminescence color and/or scene mode of the lamp, and then after the user confirms the previewed luminescence effect, the lamp is controlled to emit light. In the case that the intelligent lamp controller device is in the posture control mode, because the intelligent lamp controller device has the polyhedral shape, the intelligent lamp controller device can be turned over, the current still placement posture of the intelligent lamp controller device is determined through the placement posture determining unit, the scene mode or luminescence color setting instruction corresponding to the current still placement posture is determined, and the preview light source is controlled to emit light in the determined scene mode or luminescence color, and further, the lamp is controlled to emit light in the determined scene mode or luminescence color after the user confirms the previewed luminescence effect. In this manner, the control operations of the user are more flexible, diverse, simple and intuitive, both entertaining and interactive, thereby further enhancing the user experience.

Finally, it should be noted that the above embodiments are only used to illustrate the technical solutions of the present disclosure, but the present disclosure is not limited to the above embodiments. Although the present disclosure has been described in detail with reference to the aforementioned embodiments, those of ordinary skill in the art should understand that within the spirit and principle of the present disclosure, the technical solutions described in the aforementioned embodiments may be modified, or some or all of the technical features in the aforementioned embodiments may be equivalently substituted; and these modifications or substitutions do not make the corresponding technical solutions deviate from the protection scope of the present disclosure.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above examples of the application focus on the differences between the examples. The different optimization features between the examples can be combined to form a better example as long as the different optimization features between the examples are not contradictory, which will not be repeated here for conciseness.

What are described above is related to the examples of the present disclosure only and not limitative to the present disclosure. Various modification and change may be made by those skilled in the art. Any modification, equivalent replacement and modification made within the spirit and principle of the present disclosure are regarded as falling within the protection scope of the present disclosure.

What is claimed is:

1. An intelligent lamp controller device for wirelessly controlling a lamp, comprising:
    at least one button, configured to receive a user's operation;
    a main control circuit board, configured to generate a lamp control instruction according to the user's operation received by the at least one button;
    a control instruction transmitter, electrically connected to the main control circuit board, and configured to receive the lamp control instruction from the main control circuit board and wirelessly transmit the lamp control instruction to the lamp, so as to control the lamp to emit light;
    a preview light source, electrically connected to the main control circuit board, and configured to emit light according to the user's operation under control of the main control circuit board, so as to exhibit a luminescence effect corresponding to the user's operation to the user, and
    a placement posture determining circuitry, electrically connected to the main control circuit board, and configured to determine a posture of the intelligent lamp controller device in response to determining that the intelligent lamp controller device is placed still.

2. The intelligent lamp controller device according to claim 1, wherein
    the intelligent lamp controller device has a polyhedral shape; and
    the main control circuit board presets a scene mode setting instruction or a luminescence color setting instruction corresponding to the posture of the intelligent lamp controller device placed still.

3. The intelligent lamp controller device according to claim 2, wherein the intelligent lamp controller device further comprises a mode switching switch, electrically connected to the main control circuit board and configured to control the main control circuit board to generate, according to the user's operation, the lamp control instruction in different modes, so that the intelligent lamp controller device switches between the different modes, and the different modes comprise a button control mode and a posture control mode.

4. The intelligent lamp controller device according to claim 3, wherein
   in response to determining that the intelligent lamp controller device is in the posture control mode, the placement posture determining circuitry determines the posture of the intelligent lamp controller device placed still;
   the main control circuit board is configured to determine, according to the determined posture of the intelligent lamp controller device placed still, the scene mode setting instruction or the luminescence color setting instruction corresponding to the posture, and control the preview light source to emit light according to the scene mode setting instruction or the luminescence color setting instruction, so that the user previews the luminescence effect of the lamp; and
   the main control circuit board is further configured to generate the lamp control instruction for controlling the scene mode or the luminescence color of the lamp after the user confirms the previewed luminescence effect, and send the lamp control instruction to the control instruction transmitter.

5. The intelligent lamp controller device according to claim 4, wherein
   the intelligent lamp controller device further comprises a polyhedral transparent lampshade having n sides, wherein the polyhedral transparent lampshade is disposed on an outer periphery of the intelligent lamp controller device and surrounds the preview light source, so that the light emitted by the preview light source is transmitted outward through the transparent lampshade, and n is an integer greater than or equal to 3;
   the scene mode setting instruction or the luminescence color setting instruction preset in the main control circuit board respectively comprises n scene mode setting instructions or n luminescence color setting instructions in one-to-one correspondence to the n sides of the polyhedral transparent lampshade;
   the placement posture determining circuitry is configured to determine a side of the polyhedral transparent lampshade, and the side corresponds to a specific direction in response to determining that the intelligent lamp controller device is placed still;
   the main control circuit board is further configured to determine, according to the side corresponding to the specific direction, the scene mode setting instruction or the luminescence color setting instruction corresponding to the side, and control the preview light source to emit light in the scene mode or the luminescence color.

6. The intelligent lamp controller device according to claim 5, wherein
   the placement posture determining circuitry is an acceleration sensor;
   the acceleration sensor is configured to sense acceleration values in X, Y and Z directions of the intelligent lamp controller device, and send the acceleration values to the main control circuit board;
   the main control circuit board is further configured to determine, according to the acceleration values, a horizontally upward side of the polyhedral transparent lampshade in response to determining that the intelligent lamp controller device is placed still, determine the scene mode setting instruction or the luminescence color setting instruction corresponding to the horizontally upward side, and control the preview light source to emit light in the scene mode or the luminescence color; the transparent lampshade is a quadrangular transparent lampshade with a rectangular bottom, and a central axis of the transparent lampshade is parallel to the Z direction;
   the main control circuit board is further configured to determine, according to the acceleration values based on one of following preset rules, the horizontally upward side of the quadrangular transparent lampshade in response to determining that the intelligent lamp controller device is placed still:
   in response to determining that the acceleration values in the X and Z directions are both within a range of 0±0.1 g and the acceleration value in the Y direction is within a range of g±0.1 g, it is determined that a side of the quadrangular transparent lampshade is horizontally upward, wherein the side is parallel to the X and Z directions, perpendicular to the Y direction, and located in the Y direction relative to a center point of the intelligent lamp controller device; in response to determining that the acceleration values in the X and Z directions are both within the range of 0±0.1 g and the acceleration value in the Y direction is within a range of −g±0.1 g, it is determined that a side of the quadrangular transparent lampshade is horizontally upward, wherein the side is parallel to the X and Z directions, perpendicular to the Y direction, and located in a reverse direction of the Y direction relative to the center point of the intelligent lamp controller device;
   in response to determining that the acceleration values in the Y and Z directions are both within the range of 0±0.1 g and the acceleration value in the X direction is within the range of g±0.1 g, it is determined that a side of the quadrangular transparent lampshade is horizontally upward, wherein the side is parallel to the Y and Z directions, perpendicular to the X direction, and located in the X direction relative to the center point of the intelligent lamp controller device; and
   in response to determining that the acceleration values in the Y and Z directions are both within the range of 0±0.1 g and the acceleration value in the X direction is within the range of −g±0.1 g, it is determined that a side of the quadrangular transparent lampshade is horizontally upward, wherein the side is parallel to the Y and Z directions, perpendicular to the X direction, and is located in a reverse direction of the X direction relative to the center point of the intelligent lamp controller device;
   wherein g is a value of acceleration of gravity, and g equals to 9.8 m/s2.

7. The intelligent lamp controller device according to claim 3, wherein
   in response to determining that the intelligent lamp controller device is in the button control mode, the at least one button is configured to receive the user's operation for controlling switch or brightness of the lamp;
   the main control circuit board is configured to generate, according to the user's operation, the lamp control instruction for controlling the switch or the brightness of the lamp, and send the lamp control instruction to the control instruction transmitter.

8. The intelligent lamp controller device according to claim 7, wherein
   the at least one button is further configured to receive the user's operation for setting a luminescence color or a scene mode of the lamp;
   the main control circuit board is configured to control, according to the user's operation, the preview light source to emit light according to the set luminescence color or the scene mode of the lamp, so that the user previews the luminescence effect of the lamp; and the main control circuit board is further configured to generate the lamp control instruction for controlling the luminescence color or the scene mode of the lamp after the user confirms the previewed luminescence effect, and send the lamp control instruction to the control instruction transmitter.

9. The intelligent lamp controller device according to claim 8, wherein the at least one button comprises a color selection button and a dimming button, the color selection button is configured to select one or more colors from preset colors, and the dimming button is configured to adjust brightness of the selected color; and the main control circuit board is configured to set the luminescence color of the lamp according to the user's operation received by the color selection button, or received by the color selection button and the dimming button, to control the preview light source to emit light with the set luminescence color of the lamp.

10. The intelligent lamp controller device according to claim 4, wherein the intelligent lamp controller device further comprises a color acquisition sensor, electrically connected to the main control circuit board, and configured to acquire a color of an external target object according to the user's operation received by the at least one button or a placement posture of the intelligent lamp controller device under control of the main control circuit board, and generate a corresponding color signal; and the main control circuit board is further configured to set the luminescence color of the lamp according to the corresponding color signal, and control the preview light source to emit light with the set luminescence color of the lamp.

11. The intelligent lamp controller device according to claim 10, wherein the at least one button further comprises a color acquisition button; and in response to determining that the intelligent lamp controller device is in the button control mode, the color acquisition sensor acquires the color of the external target object according to the user's operation received by the color acquisition button under control of the main control circuit board, and generates the corresponding color signal.

12. The intelligent lamp controller device according to claim 10, wherein the luminescence color setting instruction comprises a color acquisition instruction; and in response to determining that the intelligent lamp controller device is in the posture control mode and the posture of the intelligent lamp controller device placed still corresponds to the color acquisition instruction, the color acquisition sensor acquires the color of the external target object under control of the main control circuit board and generates the corresponding color signal, wherein the posture is determined by the placement posture determining circuitry.

13. The intelligent lamp controller device according to claim 4, wherein the intelligent lamp controller device further comprises a gesture operation determining circuitry, electrically connected to the main control circuit board, and configured to determine a specific gesture operation of the user on the intelligent lamp controller device;

the main control circuit board is further configured to determine, according to the specific gesture operation of the user, that the user has confirmed the previewed luminescence effect; the gesture operation determining circuitry is an acceleration sensor; the acceleration sensor is configured to sense acceleration values in X, Y and Z directions of the intelligent lamp controller device, and send the acceleration values to the main control circuit board;

the main control circuit board is further configured to calculate a composite acceleration value according to the acceleration values in the X, Y, and Z directions, and compare the composite acceleration value with a preset threshold; and in response to determining that the composite acceleration value is greater than the preset threshold, the main control circuit board is further configured to determine that the user has confirmed the previewed luminescence effect; and the specific gesture operation comprises: tapping or shaking the intelligent lamp controller device.

14. The intelligent lamp controller device according to claim 5, further comprising:

a bracket, comprising a bottom plate and a pillar perpendicular to each other; and a supporter part, disposed on an end of the pillar, wherein the end of the pillar is away from the bottom plate and fixedly connected to the pillar;

wherein the transparent lampshade is disposed between the bottom plate and the supporter part, and the transparent lampshade, the bottom plate, and the supporter part enclose an internal space of the intelligent lamp controller device;

the at least one button is disposed on a side of the supporter part, wherein the side is away from the transparent lampshade;

the main control circuit board is disposed on a side of the supporter part facing the transparent lampshade and located in the internal space; and the preview light source is integrated on a surface of the main control circuit board facing the bottom plate.

15. The intelligent lamp controller device according to claim 14, wherein the preview light source comprises a red light emitting diode (LED), a green LED nit, and a blue LED.

16. The intelligent lamp controller device according to claim 14, wherein the preview light source comprises a red LED, a green LED, a blue LED, and a white LED.

17. The intelligent lamp controller device according to claim 14, wherein the intelligent lamp controller device further comprises a light guide part disposed in the internal space, an end of the light guide part directly faces the preview light source, and a light mixing cavity is located between the light guide part and the transparent lampshade; and the light guide part is configured to receive, through its end directly facing the preview light source, light emitted by the preview light source, and transmit the light emitted by the preview light source from an outer peripheral surface of the light guide part to the light mixing cavity, so that the light emitted by the preview light source is uniformly mixed in the light mixing cavity.

18. The intelligent lamp controller device according to claim 17, wherein the preview light source is arranged in a ring shape; and the light guide part is a light guide ring, located between the preview light source and the bottom plate of the bracket, and the end of the light guide ring away from the bottom plate directly faces the preview light source.

19. The intelligent lamp controller device according to claim 18, wherein the intelligent lamp controller device further comprises a light shielding ring, the light shielding ring is disposed on the surface of the main control circuit board facing the bottom plate, so as to prevent the light emitted by the preview light source from being directly emitted to the transparent lampshade without being transmitted by the light guide ring, wherein the light shielding ring is disposed in a manner that the light shielding ring closely attaches to an outer side of the end of the light guide ring directly facing the preview light source.

20. The intelligent lamp controller device according to claim 5, wherein an outer side of the transparent lampshade is made of a transparent material, and an inner side of the transparent lampshade is a semi-transparent spray-paint coating.

\* \* \* \* \*